United States Patent
Ekstrand et al.

(10) Patent No.: US 12,358,155 B2
(45) Date of Patent: *Jul. 15, 2025

(54) VIRTUAL ROBOT IMAGE PRESENTATION METHOD AND APPARATUS

(71) Applicant: HUAWEI TECHNOLOGIES CO., LTD., Shenzhen (CN)

(72) Inventors: Simon Ekstrand, Lund (SE); Fredrik Andreasson, Lund (SE); Johan Larsby, Lund (SE); Sha Qian, Shenzhen (CN); Le Du, Shenzhen (CN); Xueyan Huang, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/545,872

(22) Filed: Dec. 19, 2023

(65) Prior Publication Data

US 2024/0116189 A1  Apr. 11, 2024

Related U.S. Application Data

(63) Continuation of application No. 17/097,990, filed on Nov. 13, 2020, now Pat. No. 11,883,948, which is a
(Continued)

(30) Foreign Application Priority Data

Aug. 29, 2018 (CN) .......................... 201810996405.3

(51) Int. Cl.
*B25J 11/00* (2006.01)
*B25J 13/08* (2006.01)
*G06N 3/006* (2023.01)

(52) U.S. Cl.
CPC .......... *B25J 11/001* (2013.01); *B25J 11/0015* (2013.01); *B25J 13/08* (2013.01); *G06N 3/006* (2013.01)

(58) Field of Classification Search
CPC ...... B25J 11/001; B25J 11/0015; B25J 13/08; B25J 11/0005; G06N 3/006; G06F 9/451
See application file for complete search history.

(56) References Cited

U.S. PATENT DOCUMENTS

| 11,883,948 B2 * | 1/2024 | Ekstrand .............. B25J 11/0005 |
| 2002/0035569 A1 | 3/2002 | Clark et al. |

(Continued)

FOREIGN PATENT DOCUMENTS

| CN | 1926492 A * | 3/2007 | ............. H04L 67/12 |
| CN | 102707835 A | 10/2012 | |

(Continued)

*Primary Examiner* — Maurice L. McDowell, Jr.
(74) *Attorney, Agent, or Firm* — Leydig, Voit & Mayer, Ltd.

(57) ABSTRACT

A virtual robot image presentation method and an apparatus are provided to improve virtual robot utilization and user experience. In this method, an electronic device generates a first virtual robot image, and presents the first virtual robot image. The first virtual robot image is determined by the electronic device based on scene information. The scene information includes at least one piece of information in first information and second information, the first information is used to represent a current time attribute, and the second information is used to represent a type of an application currently running in the electronic device. According to the foregoing method, in a human-machine interaction process, virtual robot images can be richer and more vivid, so that user experience can be better, thereby improving virtual robot utilization of a user.

16 Claims, 16 Drawing Sheets

Related U.S. Application Data continuation of application No. PCT/CN2019/101843, filed on Aug. 21, 2019.

(56) References Cited

U.S. PATENT DOCUMENTS

| | | |
|---|---|---|
| 2009/0098911 A1 | 4/2009 | Kim et al. |
| 2009/0288022 A1 | 11/2009 | Almstrand et al. |
| 2015/0091936 A1 | 4/2015 | Peng et al. |
| 2016/0154777 A1 | 6/2016 | Shin et al. |
| 2018/0036887 A1 | 2/2018 | Shim |
| 2018/0336715 A1 | 11/2018 | Rickwald et al. |

FOREIGN PATENT DOCUMENTS

| | | |
|---|---|---|
| CN | 104516650 A | 4/2015 |
| CN | 104794045 A | 7/2015 |
| CN | 105824412 A | 8/2016 |
| CN | 106327342 A | 1/2017 |
| CN | 107122189 A | 9/2017 |
| CN | 107329990 A | 11/2017 |
| CN | 107918518 A | 4/2018 |
| CN | 109358923 A | 2/2019 |
| WO | 2018022808 A1 | 2/2018 |

\* cited by examiner

VIRTUAL ROBOT IMAGE PRESENTATION METHOD AND APPARATUS

CROSS-REFERENCE TO RELATED APPLICATIONS

This application is a continuation of U.S. patent application Ser. No. 17/097,990, filed on Nov. 13, 2020, which is a continuation of International Application No. PCT/CN2019/101843, filed on Aug. 21, 2019. The International Application claims priority to Chinese Patent Application No. 201810996405.3, filed on Aug. 29, 2018. All of the aforementioned patent applications are hereby incorporated by reference in their entireties.

TECHNICAL FIELD

This application relates to the field of information technologies, and in particular, to a virtual robot image presentation method and an apparatus.

BACKGROUND

With the continuous development of computer networks, human-machine interaction becomes a hotspot. Human-machine interaction is applied to various scenarios, mainly including various robot interfaces, intelligent customer service systems, personal assistant services, intelligent assistants, voice assistants, and the like. Human-machine interaction in the various scenarios may be implemented by using a virtual robot (an existing intelligent assistant, an existing smart assistant, an existing voice assistant, an existing personal assistant, and the like each may be referred to as a virtual robot). An objective of human-machine interaction is to eventually implement emotional communication between a human and a computer as between humans, to generate continuous interactive attraction between the human and the virtual robot.

However, in a current human-machine interaction process, a virtual robot mostly faces a user with a single image, and merely helps, from an information feedback level, the user to complete a target instruction, but has not been capable of emotionally resonating with the user. This leads to low virtual robot utilization and poor human-machine interaction experience.

SUMMARY

This application provides a virtual robot image presentation method and an apparatus, to improve virtual robot utilization and user experience.

According to a first aspect, this application provides a virtual robot image presentation method, applied to an electronic device having a screen. The electronic device generates a first virtual robot image, and presents the first virtual robot image. The first virtual robot image is determined by the electronic device based on scene information. The scene information includes at least one piece of information in first information and second information, the first information is used to represent a current time attribute, and the second information is used to represent a type of an application currently run in the electronic device.

According to the foregoing method, in a human-machine interaction process, a virtual robot image may be generated based on a time attribute and/or a type of an application currently used in the electronic device, so that various images can be obtained based on different times and/or different types of currently used apps. Therefore, virtual robot images can be enriched, so that user experience can be better, and virtual robot utilization of a user can be improved.

In an embodiment, the scene information further includes third information, and the third information is used to represent a natural environment. In this way, the electronic device may generate the first virtual robot image not only with reference to the current time attribute and/or the type of the currently used app, but also with reference to a current natural environment in which the electronic device is located, so that the first virtual robot image is richer and more vivid.

The electronic device may determine the first virtual robot image based on the obtained scene information after obtaining the scene information.

When the scene information includes only one piece of information, the one piece of information (namely, the one piece of scene information) is the first information or the second information, and the electronic device may determine, according to a preset mapping relationship between scene information and a virtual robot image, a virtual robot image corresponding to the one piece of scene information, and directly use the determined virtual robot image as the first virtual robot image. When the scene information includes a plurality of pieces of information, the electronic device may separately determine, according to a preset mapping relationship between scene information and a virtual robot image, a virtual robot image corresponding to each of the plurality of pieces of scene information, and finally generate the first virtual robot image by merging the determined plurality of virtual robot images, so that the generated first virtual robot image can adapt to different scene information.

According to the foregoing method, the electronic device can accurately generate the first virtual robot image, and the generated first virtual robot image combines features of a plurality of pieces of information, so that the first virtual robot image can be relatively vivid.

In an embodiment, a mapping relationship of a virtual robot image may be pre-stored, and the mapping relationship includes virtual robot images corresponding to different scene information. In this way, the electronic device can search the mapping relationship based on one piece of scene information, to accurately find a corresponding virtual robot image.

In an embodiment, the electronic device may further select the first virtual robot image suitable for the user from virtual robot images based on personalized information (for example, social information, shopping information, and a physiological feature, which may also be used as one or more types of scene information) of a user. In this way, a subsequently presented virtual robot image can better resonate with the user, so that user experience can be better.

In an embodiment, after the electronic device presents the first virtual robot image, when detecting an input operation of the user, the electronic device may further determine instruction information of the user based on the input operation, determine, according to a preset mapping relationship between instruction information and a virtual robot image, a second virtual robot image corresponding to the instruction information, then generate a third virtual robot image by merging the presented first virtual robot image and the newly determined second virtual robot image, and replace the presented first virtual robot image with the third virtual robot image to update presentation, where the third virtual robot image reflects scene information corresponding to the first virtual robot image and the instruction information corresponding to the second virtual robot image.

According to the foregoing method, a virtual robot image can constantly adapt to user emotion in the human-machine interaction process, so that user experience is better.

In an embodiment, the input operation includes one or more of the following operations: a voice input, a text input, a touch operation, and the like. In this way, the electronic device can detect the input operation of the user in a plurality of manners.

In an embodiment, before the electronic device generates the first virtual robot image, the electronic device may further turn on a virtual robot according to a user instruction, and enable the virtual robot to enter a wait mode. In this way, the virtual robot may be presented to the user first with a default virtual robot image, and subsequently, the virtual robot image is updated constantly based on an actual status (for example, different scene information).

In an embodiment, the third information may be one or more of the following: weather information, temperature information, and the like. The weather information may include, but not limited to, one or more of the following: normal weather information, extreme weather information, alarm weather information, current air quality information, and air quality change information. The temperature information may include, but not limited to, one or more of the following: current temperature information and temperature change information. The air quality change information may include one or more of the following: information about an air quality change caused by a location change and information about an air quality change caused by a time change. The temperature change information may include one or more of the following: information about a temperature change caused by a location change and information about a temperature change caused by a time change. In this way, when a virtual robot image is determined, the virtual robot image can adapt to different scene information, so that the virtual robot image can be richer, and user experience can be better.

In an embodiment, the first information may be, but not limited to, one or more of the following: festival information and current time period information. The second information may be, but not limited to, one or more of a reading type, a music type, an information query type, and a default no-operation type. In this way, when a virtual robot image is determined, the virtual robot image can adapt to different scene information, so that the virtual robot image can be richer, and user experience can be better.

In an embodiment, any virtual robot image (including the first virtual robot image, the second virtual robot image, and the third virtual robot image) may be a static image or a dynamic image. In this way, the virtual robot image can be more flexible.

According to a second aspect, an embodiment of this application further provides an electronic device. The electronic device has a function of implementing behavior of the electronic device in the method example. The function may be implemented by using hardware, or may be implemented by hardware executing corresponding software. The hardware or software includes one or more modules corresponding to the foregoing function.

In a possible implementation, a structure of the electronic device includes a processing unit and a display unit, and may further include a communications unit and the like. The units may perform the corresponding function in the method example. For details, refer to the detailed descriptions in the method example. Details are not described herein again.

In an embodiment, the structure of the electronic device includes a processor and a screen, and may further include a communications module and a memory. The communications module is configured to obtain scene information. The screen is configured to present a virtual robot image. The processor is configured to support the electronic device in performing the corresponding function in the method. The memory is coupled to the processor, and stores a program instruction and data that are necessary for the electronic device.

In an embodiment, the electronic device includes a processor and a memory that are connected to each other, the processor is configured to read and execute a program instruction stored in the memory, to perform the method in any possible design of the first aspect.

According to a third aspect, an embodiment of this application further provides a computer storage medium, where the computer storage medium stores a computer executable instruction, and when the computer executable instruction is invoked by a computer, the computer is enabled to perform the method in any possible design of the first aspect.

According to a fourth aspect, an embodiment of this application further provides a computer program product including an instruction, where when the computer program product is run in an electronic device, the electronic device is enabled to perform the method in any possible design of the first aspect.

According to a fifth aspect, an embodiment of this application further provides an electronic device. The electronic device may be a chip, and the chip is connected to a memory, and is configured to read and execute a program instruction stored in the memory, to implement the method in any possible design of the first aspect.

DESCRIPTION OF EMBODIMENTS

Figure 1:
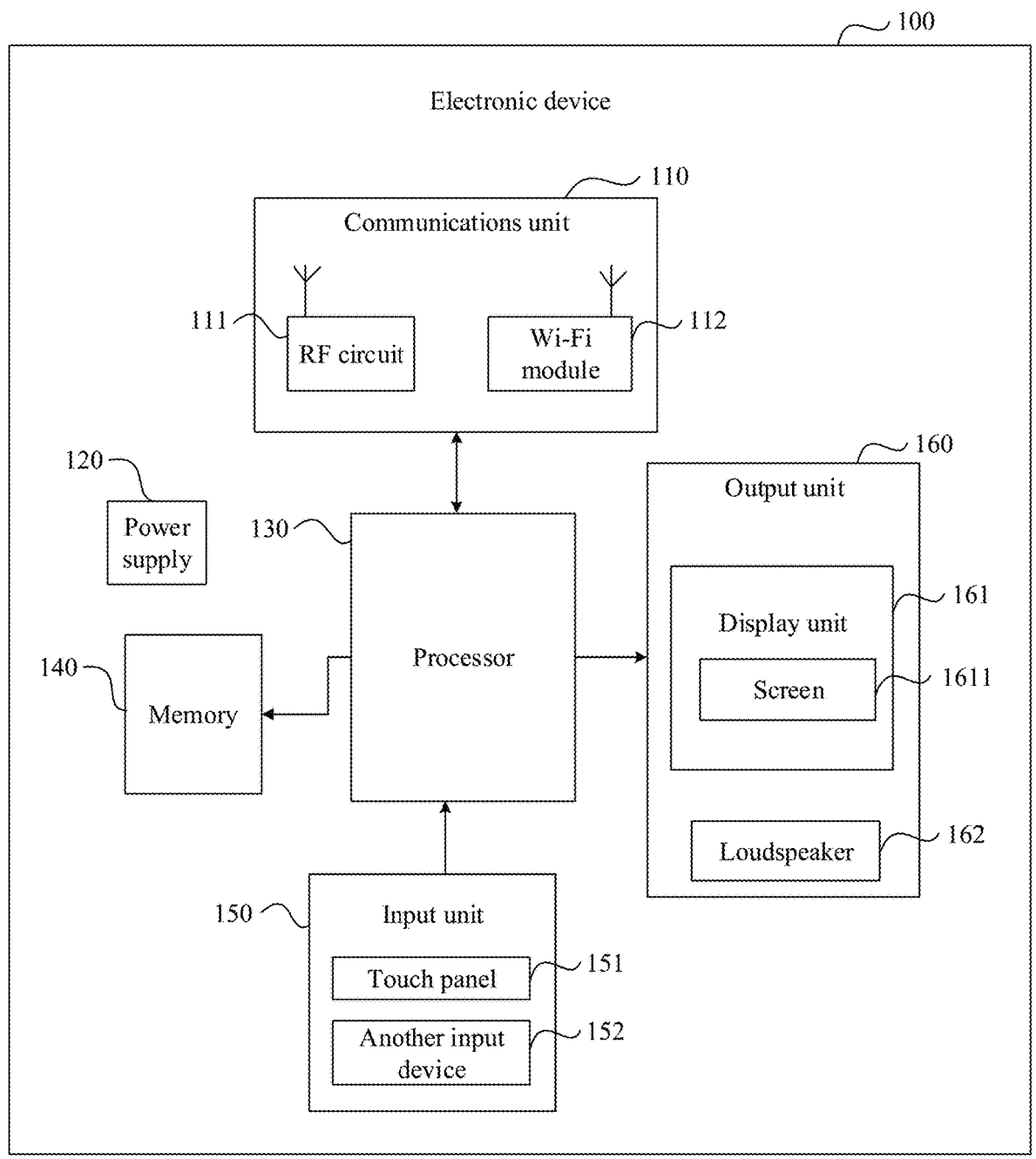
FIG. 1 is a structural diagram of an electronic device according to this application.

The following further describes in detail this application with reference to accompanying drawings.

Embodiments of this application provide a virtual robot image presentation method and an apparatus, to improve virtual robot utilization and user experience. The method and the apparatus in this application are based on a same inventive idea. Because problem resolving principles of the method and the apparatus are similar, mutual reference may be made to implementations of the apparatus and the method, and repeated parts are not described.

In the following, some terms in this application are described, so as to help persons skilled in the art have a better understanding.

1. A virtual robot image is a displayed specific form, posture, emotion, portrait, and the like of a virtual robot. The virtual robot is a virtual person, and can interact with a person. For example, the virtual robot may be an existing common intelligent assistant, smart assistant, voice assistant, personal assistant, or the like. It should be noted that with the development, a future virtual robot may be alternatively in another representation form. This is not limited in this application.

2. An electronic device may be a device that has a screen and that can display a virtual robot image. Optionally, the electronic device may be a terminal device. For example, the terminal device may be a mobile phone, a notebook computer, a tablet computer, a vehicle-mounted computer, a personal digital assistant (PDA), a smartwatch, a personal computer (PC), a television, or the like. Certainly, the electronic device is not limited to the foregoing listed terminal devices. This is not limited in this application.

The electronic device may support a plurality of applications, for example, some or all of a text processing application, a telephone application, an e-mail application, an instant messaging application, a photo management application, a web browsing application, a digital music player application, a digital video player application, and the like.

3. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

4. "A plurality of" refers to two or more than two.

5. In the descriptions of this application, terms such as "first" and "second" are merely for the purpose of differentiating between descriptions, but cannot be understood as indicating or implying relative importance, and cannot be understood as indicating or implying a sequence.

To describe the technical solutions in the embodiments of this application more clearly, the following describes, in detail with reference to the accompanying drawings, the virtual robot image presentation method and the apparatus that are provided in the embodiments of this application.

FIG. 1 shows a virtual robot image presentation apparatus according to an embodiment of this application. The apparatus is applied to an electronic device. FIG. 1 is a block diagram of a partial structure of the electronic device related to this embodiment of this application. As shown in FIG. 1, an electronic device 100 includes components such as a communications unit 110, a power supply 120, a processor 130, a memory 140, an input unit 150, and an output unit 160. A person skilled in the art may understand that the structure of the electronic device shown in FIG. 1 does not constitute any limitation to the electronic device, and more or fewer components than those shown in the figure may be included, or some components may be combined, or a different component arrangement may be used.

The following introduces constitution components of the electronic device 100 with reference to FIG. 1.

The communications unit 110 may provide a voice or data communication capability, and may provide a wired or wireless communication interface. Optionally, the communications unit 110 may include some or all of a radio frequency (RF) transceiver element, a global positioning system (GPS) transceiver element (for example, an RF circuit 111 shown in FIG. 1), a wireless fidelity (Wi-Fi) element (for example, a Wi-Fi module 112 shown in FIG. 1), and another element. The communications unit 110 may be alternatively a combination of software and hardware (for example, an antenna, a modem, a codec, and an analog/digital processing circuit).

The RF circuit 111 may be configured to implement data receiving and sending in an information receiving and sending process or in a calling process. Particularly, after receiving downlink data of a base station, the RF circuit 111 sends the downlink data to the processor 130 for processing, and sends to-be-sent uplink data to the base station. Generally, the RF circuit 111 includes, but not limited to, an antenna, at least one amplifier, a transceiver, a coupler, a low noise amplifier (LNA), and a duplexer. In addition, the RF circuit 111 may further communicate with a network and another device through wireless communication. The wireless communication may use any communications standard or protocol, including, but not limited to, global system for mobile communications (GSM), general packet radio service (GPRS), code division multiple access (CDMA), wideband code division multiple access (WCDMA), long term evolution (LTE), e-mail, and short messaging service (SMS).

Wi-Fi belongs to a short range wireless communications technology, and the electronic device 100 may be connected to an access point (AP) by using the Wi-Fi module 112, to access a data network. The Wi-Fi module 112 may be configured to implement data receiving and sending in a process of communicating with another device.

The memory 140 may be configured to store a software program and a module. The processor 130 runs the software program and the module that are stored in the memory 140, to implement various function applications and data processing of the electronic device 100. Optionally, the memory 140 may mainly include a program storage region and a data storage region. The program storage region may store an operating system, various applications, and the like. The data storage region may store data and the like created based on use of the electronic device 100. Optionally, the memory 140 may further store static data (for example, an image), a rule, and the like that are required by the processor 130 and another module. For example, in this embodiment of this application, the memory 140 may store a mapping relationship between a virtual robot image and each of first information, second information, and third information. In addition, the memory 140 may include a high speed random access memory, and may further include a non-volatile memory, for example, at least one disk storage device, a flash memory, or another non-volatile solid state storage device.

It should be noted that a function of the memory 140 may be reflected in the electronic device 100 shown in FIG. 1, or may be implemented in a cloud server or the like. Description is provided herein by using a part of the electronic device 100 as an example, and this does not limit the memory.

The input unit 150 may be configured to receive input digit or character information, and generate a button signal input related to user setting and function control of the electronic device 100. The input unit 150 may include a touch panel 151 and another input device 152.

The touch panel 151 may be alternatively referred to as a touchscreen, may collect a touch operation of a user on or near the touch panel (for example, an operation of the user on the touch panel 151 or near the touch panel 151 by using any suitable object or accessory such as a finger, a stylus, or the like), and drive a corresponding connection apparatus according to a preset formula. Optionally, the touch panel 151 may include two parts, namely, a touch detection apparatus and a touch controller. The touch detection apparatus detects a touch orientation of the user, detects a signal generated by the touch operation, and sends the signal to the touch controller. The touch controller receives touch information from the touch detection apparatus, converts the touch information into touch point coordinates, sends the touch point coordinates to the processor 130, and can receive and execute a command sent by the processor 130. For example, when the user touches, on the touch panel 151 by using a hand, a virtual robot image displayed on a screen 1611, the touch detection apparatus detects a signal generated by the touch, and then sends the signal to the touch controller. Then, the touch controller converts the signal into coordinates, and sends the coordinates to the processor 130. The processor 130 determines, based on the coordinates and a type of the signal (touch), an operation (image update) performed on the virtual robot image. Then, the processor 130 instructs to update the virtual robot image.

In addition, the touch panel 151 may be implemented in a resistive form, a capacitor form, an infrared form, a surface acoustic wave form, or the like.

Optionally, the another input device 152 may include, but not limited to, one or more of a physical keyboard, a functional button (for example, a volume control button, or a switch button), a trackball, a mouse, a joystick, and the like.

The output unit 160 may be configured to output various information used for user interaction or provided for the user. Optionally, the output unit 160 may include a display unit 161 and a loudspeaker 162 (which may be used to provide a voice output), and may further include a vibrating motor (which may be used to provide vibrating feedback) and the like.

The display unit 161 may be configured to display information input by the user, information provided for the user, and various menus of the electronic device 100. The display unit 161 is a display system of the electronic device 100, and is configured to present an interface, and implement human-machine interaction. For example, when the input unit 150 receives an instruction of the user for human-machine interaction, the input unit 150 transmits the instruction to the processor 130, and then the processor 130 displays a virtual robot image (the virtual robot image may be displayed by using the screen 1611) by using the display unit 161 according to the instruction, so that the user sees the virtual robot image, to implement human-machine interaction.

The display unit 161 may include the screen 1611. Optionally, the screen 1611 may be configured by using a liquid crystal display (LCD), an organic light-emitting diode (OLED), or the like. Further, the touch panel 151 may cover the screen 1611. After detecting a touch operation on or near the touch panel 151, the touch panel 151 sends the touch operation to the processor 130, to determine a type of a touch event. Subsequently, the processor 130 provides a corresponding visual output on the screen 1611 based on the type of the touch event. For example, after detecting an operation of fondling, by the user, a virtual robot on the touch panel 151, the touch panel 151 sends the operation to the processor 130. The processor 130 determines a type of a touch event as fondling, and displays, on the screen 1611, a virtual robot image corresponding to fondling, for example, the fondled virtual robot may be a robot image with a shy look, to present a changing virtual robot image.

Although in FIG. 1, the touch panel 151 and the screen 1611 implement input and output functions of the electronic device 100 as two independent components, in some embodiments, the touch panel 151 and the screen 1611 may be integrated, to implement the input and output functions of the electronic device 100.

The processor 130 is a control center of the electronic device 100, connects all parts of the entire electronic device by using various interfaces and lines, and performs various functions and data processing of the electronic device 100 by running or executing the software program and/or module stored in the memory 140 and invoking the data stored in the memory 140, to implement various services based on the electronic device. Optionally, the processor 130 may include one or more processing units. The processor 130 may integrate an application processor and a modem processor. The application processor mainly processes an operating system, a user interface, an application, and the like, and the modem processor mainly processes wireless communication. It may be understood that the modem processor may not be integrated into the processor 130. For example, in this application, the processor 130 may include a display drive unit. After the processor 130 generates a virtual robot image, the processor 130 may control, by using the display drive unit, the screen 1611 to present the virtual robot image. For another example, the memory 140 stores a display driver, and the processor 130 may invoke the driver in the memory 140, to control the screen 1611 to present a virtual robot image.

The electronic device 100 further includes the power supply 120 (for example, a battery) supplying power to the components. Optionally, the power supply 120 may be logically connected to the processor 130 by using a power supply management system, to implement, by using the power supply management system, functions of managing charging, discharging, power consumption, and the like.

It should be noted that although not shown in FIG. 1, the electronic device 100 may further include a camera, a Bluetooth module, an audio circuit, a microphone, a sensor, and the like. Details are not described herein again.

Figure 2:
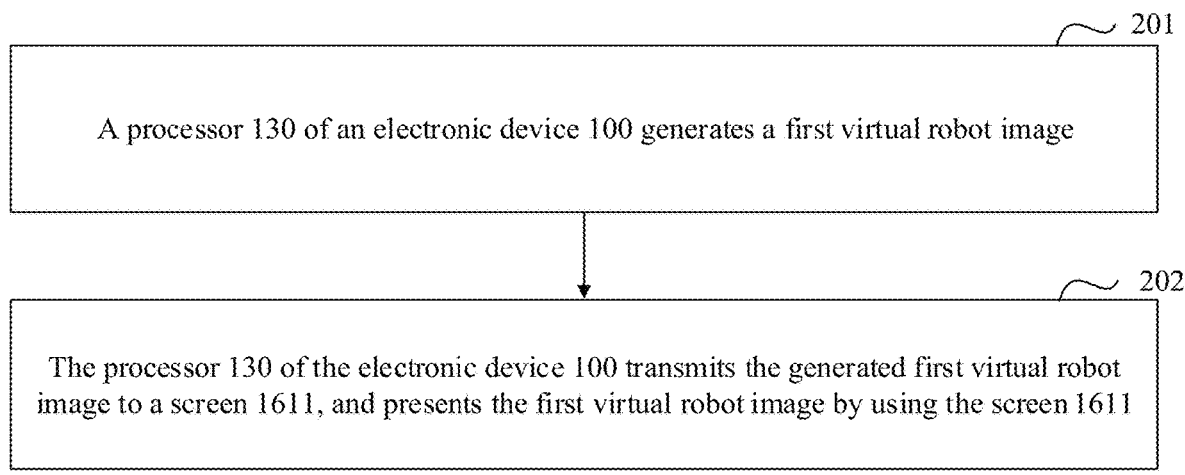
FIG. 2 is a flowchart of a virtual robot image presentation method according to this application.

An embodiment of this application provides a virtual robot image presentation method, applied to the electronic device 100 shown in FIG. 1. Therefore, this embodiment of this application is merely described by using the electronic device 100 as an example. As shown in FIG. 2, a specific process of the virtual robot image presentation method provided in this embodiment of this application includes the following steps:

Step 201. The processor 130 of the electronic device 100 generates a first virtual robot image. The first virtual robot image is generated by the processor 130 based on scene information. The scene information includes at least one piece of information in first information and second information, the first information is used to represent a current time attribute, and the second information is used to represent a type of an application currently run in the electronic device 100.

In this application, a virtual robot image has a feature capable of reflecting scene information. For example, if the first information is the dragon boat festival, the feature of the virtual robot image may be a feature related to a dragon boat and a traditional Chinese rice-pudding. Alternatively, if the second information is a music application, the feature of the virtual robot image may be a feature related to a microphone, a disc, an earphone, and the like. A specific design of the virtual robot image is not limited provided that a feature related to the scene information can be presented.

In an embodiment, before the processor 130 generates the first virtual robot image, the electronic device 100 may receive, by using the input unit 150, a user instruction input by a user, and the processor 130 turns on a virtual robot according to the instruction, and enables the virtual robot to enter a wait mode. In an embodiment, the user instruction may be an instruction of activating the electronic device 100, an instruction of the user for turning on a screen of the electronic device 100, an instruction of the user for unlocking the electronic device 100, an instruction of the user for waking up the virtual robot, or the like. After the electronic device 100 receives the user instruction, the electronic device 100 turns on the virtual robot. For example, the user turns on the electronic device 100, and activates the electronic device 100 by pressing a button, entering a password, inputting a fingerprint, or the like.

In an embodiment, after the virtual robot enters the wait mode, the processor 130 may first control the screen 1611 to present a default virtual robot image of a system, and subsequently, constantly update the presented virtual robot image based on the scene information.

In an embodiment, the first information may be one or more of the following: festival information, current time period information, and the like. For example, the festival information may include a global festival, a special festival of each country, a special festival related to the user, and the like. The global festival, for example, is the New Year's Day, the Christmas day, the Valentine's Day, the Halloween, or the like. The special festival of each country, for example, is Chinese lantern festival, Chinese dragon boat festival, or the like. The special festival related to the user, for example, is the birthday, the wedding anniversary, or the like of the user. For example, the current time period information may be classified into three main time periods, namely, a working time period, a dining time period, and a sleeping time period. For example, default working time periods may be: 08:00 to 11:30, 12:30 to 17:30, and 18:30 to 22:30, default dining time periods may be 11:30 to 12:30 and 17:30 to 18:30, and a default sleeping time period may be 22:30 to 08:00. Optionally, the time period information may be set by the user in the electronic device 100, and stored by the processor 130 in the memory 140. In other words, the time period information may be defined by the user. It should be noted that the foregoing festival information and time period information are merely examples, and other festival information or other time period information may be further included. This is not limited in this application.

In an embodiment, the second information may be one or more of the following: a reading type, a music type, an information query type, a default no-operation type, and the like. For example, an application of the reading type may include reading an e-book, browsing content such as a web page, microblog, and news, and the like. The music type may include a running music application, and a case of playing back a song. The information query type may include a case of opening an input box of a browser and the like, a case of entering a key word in any search box, and the like. The default no-operation type may be a case in which no application is currently opened in the electronic device 100. It should be noted that descriptions of the foregoing types are merely examples, and a plurality of other cases may be further included. This is not limited in this application.

In an embodiment, the scene information may further include third information, and the third information is used to represent a natural environment. Optionally, the third information may be one or more of the following: weather information and temperature information. For example, the weather information may include one or more of the following: normal weather information, extreme weather information, alarm weather information, current air quality information, and air quality change information. The temperature information may include one or more of the following: current temperature information and temperature change information. The air quality change information may include one or more of the following: information about an air quality change caused by a location change and information about an air quality change caused by a time change. The temperature change information may include one or more of the following: information about a temperature change caused by a location change and information about a temperature change caused by a time change.

The normal weather information may include common weather such as a sunny day, a cloudy day, a rainy day, and a snowy day. The extreme weather information may include smog, a rainstorm, hail, a temperature higher than 38 degrees centigrade, a temperature lower than minus 10 degrees centigrade, and the like. The alarm weather information may be information about an emergent weather alarm such as typhoon. The current air quality information may be a PM2.5 value, a PM10 value, and the like.

For example, the location change may be a change caused when an address location changes greatly, or may be an indoor-outdoor change, or may be another location change. For example, the information about the air quality change caused by the location change may be information about a difference between indoor air quality and outdoor air quality. For example, a difference between an indoor PM2.5 value and an outdoor PM2.5 value is greater than 50. For another example, the information about the temperature change caused by the location change may be information about a temperature difference between cities, or may be information about a difference between an indoor temperature and an outdoor temperature, or the like.

For example, the foregoing time change may be a change from a previous day to today, or may be a change between different time periods in a day, or may be another time change. For example, the information about the air quality change caused by the time change may be information about an air quality change between yesterday and today. For another example, the information about the temperature change caused by the time change may be information about a temperature difference between a lowest temperature of yesterday and an estimated lowest temperature of today and information about a temperature difference between a highest temperature of yesterday and an estimated highest temperature of today, or may be information about a difference between temperatures at 8:00 AM and 15:00 PM.

In a process of generating, by the electronic device 100, the first virtual robot image, the electronic device 100 may collect current scene information in various manners. For example, the electronic device 100 collects current time information by using a clock module, compares the current time information with calendar information stored in the memory 140, and finds information about a corresponding festival; or collects a current room temperature by using a sensor; or collects, by using the processor 130, information about a type of an application currently used in the electronic device 100; or collects, by using the processor 130, information about a weather status provided by weather software installed in the electronic device 100. Then, the electronic device 100 generates the first virtual robot image based on the currently obtained scene information.

In an embodiment, when obtaining the scene information, the electronic device 100 may obtain system information, or collect information provided by a third-party content provider, or the like. The electronic device 100 may obtain different scene information by using different methods. For example, that the electronic device 100 obtains the first information may be that the electronic device 100 may collect festival information provided in a Chinese lunar calendar application (or another calendar application); or that the electronic device 100 may collect time period information corresponding to a user schedule recorded in a system; or the like. For another example, that the electronic device 100 obtains the third information may be that the electronic device 100 may collect weather information provided in the Moji weather application (or another weather application); or that the electronic device 100 may obtain temperature information from a sensor (for example, a temperature sensor) of the electronic device 100, or that the electronic device 100 obtains temperature information from a smart home device (for example, a device capable of measuring a room temperature) connected to the electronic device 100; or that the electronic device 100 may obtain air quality information from a smart home device, namely, an air purifier, connected to the electronic device 100. For another example, that the electronic device 100 obtains the second information may be that the electronic device 100 identifies a type of an application currently run in the electronic device 100, namely, identifies an activity that is executed by the electronic device 100 when the user turns on the virtual robot. For example, when the user currently opens an e-book or browses content such as a web page, microblog, or news, the electronic device 100 obtains the reading type. For another example, when the user opens a music application or plays back a song, the electronic device 100 obtains the music type. For another example, when the user opens a browser, and presses an input box or enters a search key word in a search box, the electronic device 100 obtains the information query type. For another example, when the user does not open any application, or perform any operation (for example, the user directly turns on the virtual robot on a main interface of the electronic device 100, or the user turns on the virtual robot through voice), the electronic device 100 obtains the default no-operation type.

To sum up, because the scene information may include only one piece of information or include a plurality of pieces of information, that the electronic device 100 determines the first virtual robot image based on the obtained scene information may be divided into the following two cases:

In a first case, when the scene information includes only one piece of information, the electronic device 100 directly generates the first virtual robot image based on the scene information. The one piece of information may be any one piece of information in the first information, the second information, and the third information.

In a second case, when the scene information includes the plurality of pieces of information, the electronic device 100 separately determines, according to a preset mapping relationship between scene information and a virtual robot image, a virtual robot image corresponding to each of the plurality of pieces of scene information, and then generate the first virtual robot image by merging the determined plurality of virtual robot images. Optionally, the plurality of pieces of information may be a plurality of pieces of information in the first information, the second information, and the third information.

In an example implementation, in the foregoing two cases, when determining a virtual robot image corresponding to any one piece of information, the electronic device 100 may pre-establish a mapping relationship between different virtual robot images and different scene information. For example, the mapping relationship may be shown in the following table 1.

TABLE 1

Mapping relationship between a virtual robot and scene information

| | Scene information | | Emotional feedback of a virtual robot | Virtual robot image |
|---|---|---|---|---|
| First information | Global festival | Christmas day | Role play 1 | Cosplay 1 |
| | | Halloween | Role play 2 | Cosplay2 |
| | Special festival of each country | Dragon boat festival | Role play 3 | Cosplay3 |
| | | Lantern festival | Role play 4 | Cosplay4 |
| | Special festival related to an individual | Birthday/wedding anniversary | Scattering flowers to send blessings | Bless |
| | Working time period | 08:00 to 11:30; 12:30 to 17:30; 18:30 to 22:30 | Default expression | Neutral |
| | Dining time period | 11:30 to 12:30; 17:30 to 18:30 | Licking | Food |
| | Sleeping time period | 22:30 to 08:00 | Yawning | Idle |

TABLE 1-continued

Mapping relationship between a virtual robot and scene information

|  |  |  | Emotional feedback of a virtual robot | Virtual robot image |
|---|---|---|---|---|
|  | Scene information |  |  |  |
| Second information | Music type |  | Singing while wearing a headset | Music |
|  | Reading type |  | Wearing glasses | Reading |
|  | Information query type |  | Magnifying glass | Browsing |
|  | Default no-operation type |  | Default expression | Neutral |
| Third information | Temperature change information | Temperature plummeting (for example, the temperature plummets by 10° C.) | Trembling | Cold |
|  | Extreme weather information | Temperature higher than 38° C. | Sweating | Hot |
|  |  | Smog | Wearing a mask | Smog |
|  | Alarm weather information | Typhoon Mess | Messy |  |

Figure 3:
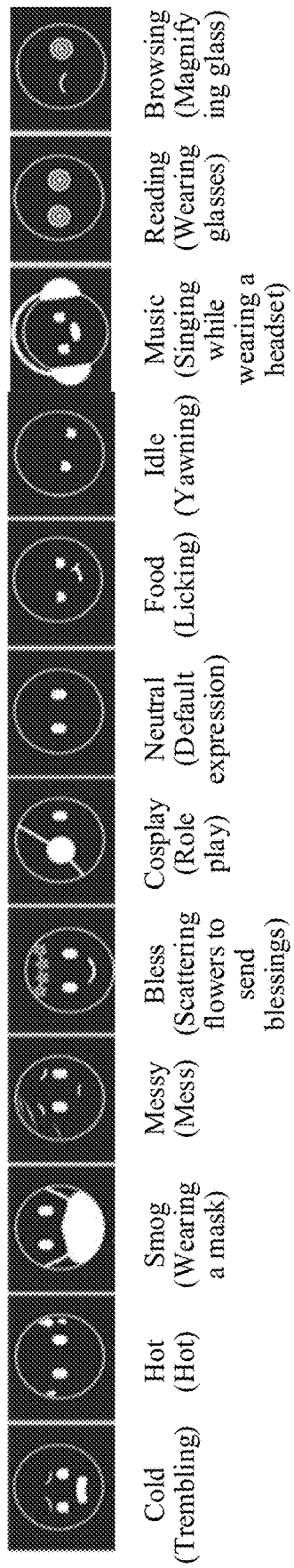
FIG. 3 is a schematic diagram of a virtual robot image according to this application.

Some specific presentations of the virtual robot images in Table 1 may be virtual robot images shown in FIG. 3.

It should be noted that Table 1 merely lists virtual robot images corresponding to some information by way of example, and virtual robot images corresponding to much information are not shown in Table 1, and are not listed herein. It should be noted that the virtual robot images are merely examples, and do not constitute any limitation to information and a virtual robot image in this application. For example, an expression of hot (hot) is not limited to the sweating in Table 1, and may be alternatively eating an ice pop, sticking the tongue out, enjoying the air conditioner, enjoying the fan blowing, or the like.

In the foregoing two cases, because the first information, the second information, or the third information included in the scene information further includes at least one piece of sub-information, when any one piece of scene information in the three pieces of information includes only one piece of sub-information, the processor 130 of the electronic device 100 directly searches the mapping table 1 for a virtual robot image corresponding to the scene information. When any one piece of scene information in the three pieces of information includes a plurality of pieces of sub-information, the electronic device 100 may first search the mapping table 1 for a virtual robot image corresponding to each piece of sub-information, then generate a new virtual robot image by merging the found plurality of virtual robot images, and use the new virtual robot image as a determined virtual robot image corresponding to the any one piece of scene information.

In an embodiment, the virtual robot image may be classified as a static image or a dynamic image. For example, an image of singing while wearing a headset in Table 1 is a dynamic image.

Figure 4:
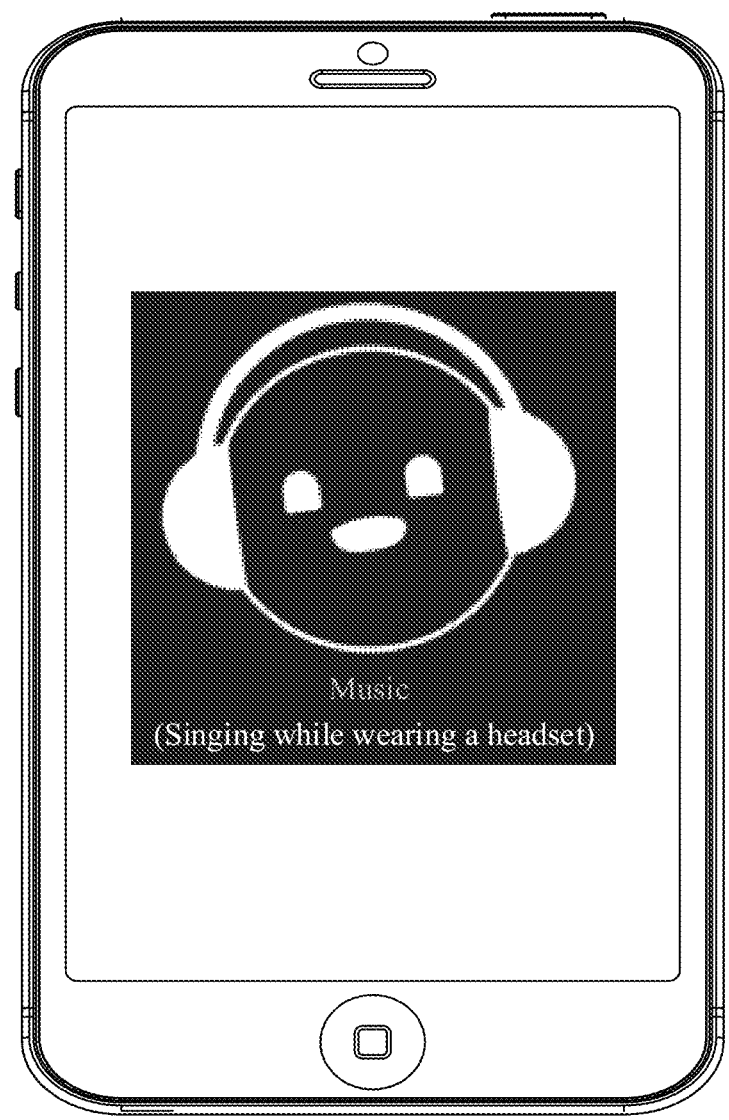
FIG. 4 is a schematic diagram of another virtual robot image according to this application.

For example, in the foregoing first case, in a process of opening, by the user, a music app to listen to music in the used electronic device 100, when the input unit 150 of the electronic device 100 receives a user instruction of instructing to turn on the virtual robot, the processor 130 of the electronic device 100 determines a type of the application currently used in the electronic device as the music type, further determines, according to Table 1, that a virtual robot image corresponding to the music type is an image of singing while wearing a headset (namely, Music), and uses the virtual robot image as the first virtual robot image, for example, as shown in FIG. 4.

Figure 5:
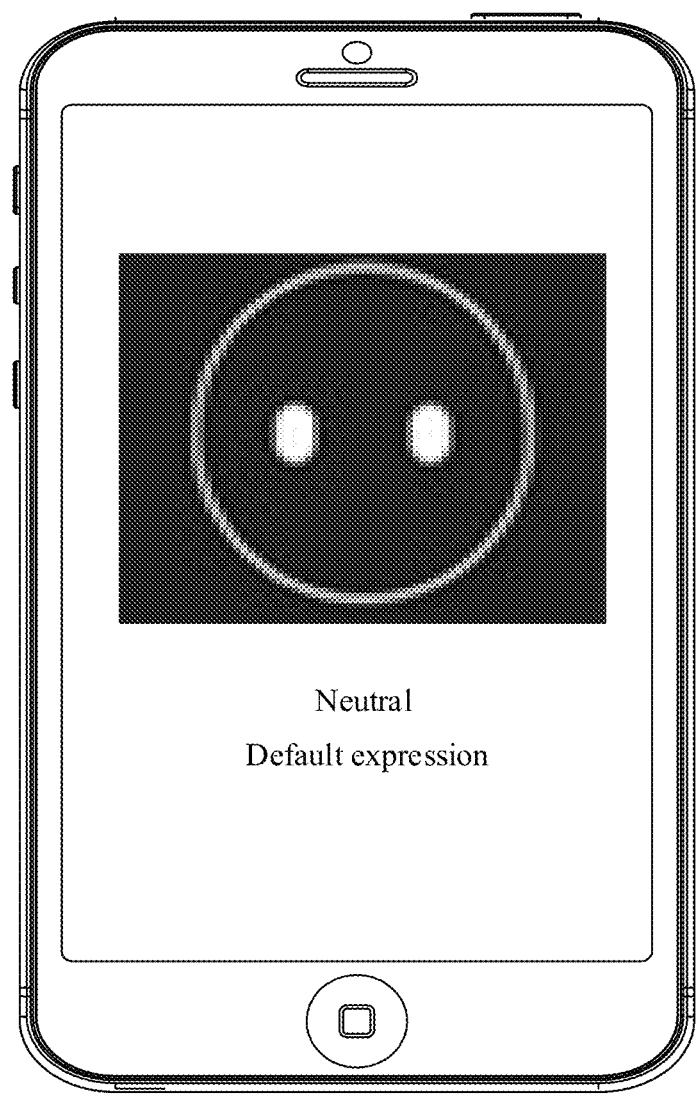
FIG. 5 is a schematic diagram of another virtual robot image according to this application.

For another example, in the foregoing first case, after turning on the electronic device 100, the user directly wakes up the virtual robot. In this case, the processor 130 of the electronic device 100 determines that a type of a current application is the default no-operation type. Then, the processor 130 determines, according to Table 1, a default expression (Neutral) as the first virtual robot image (namely, a default virtual robot image), for example, as shown in FIG. 5.

Figure 6:
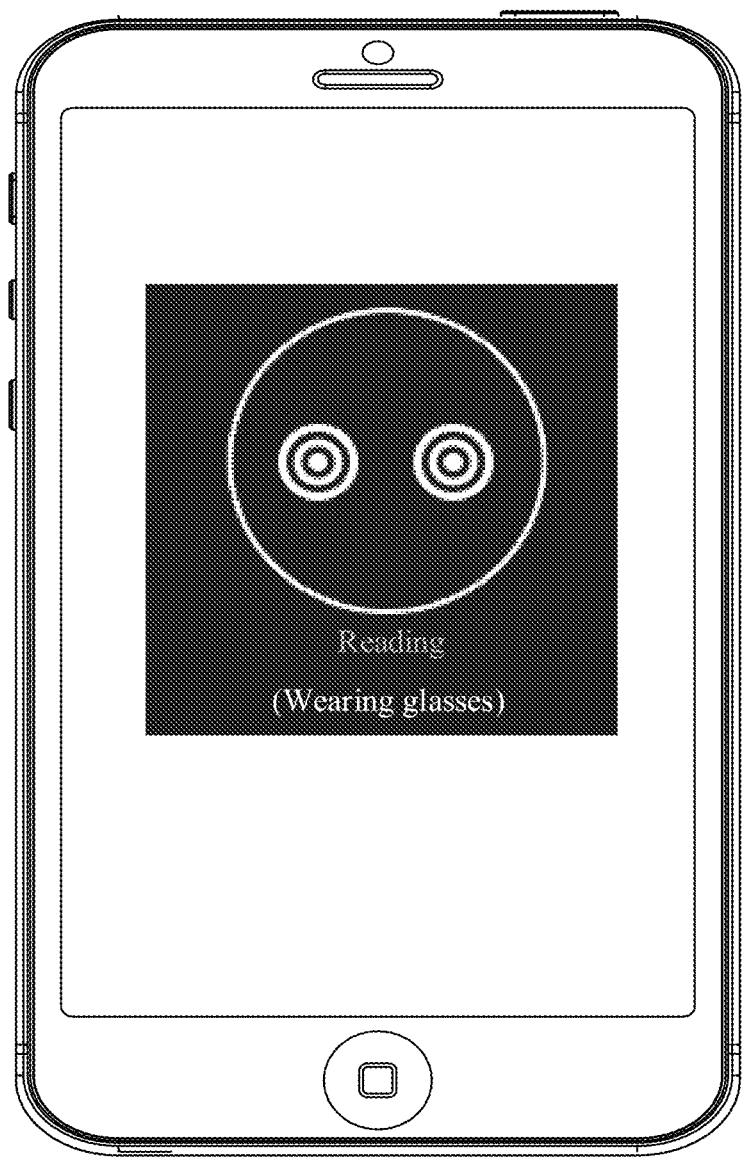
FIG. 6 is a schematic diagram of another virtual robot image according to this application.

For another example, in the foregoing first case, in a process of opening, by the user, a reading app to read an e-book, when the processor 130 of the electronic device 100 receives a user instruction of instructing to turn on the virtual robot, the processor 130 determines a type of the application currently used in the electronic device 100 as the reading type. Then, the processor 130 further determines, according to Table 1, an image that is of wearing glasses (Reading) and that corresponds to the reading type as the first virtual robot image, for example, as shown in FIG. 6.

Figure 7:
FIG. 7 is a schematic diagram of another virtual robot image according to this application.

For another example, the user wakes up the virtual robot when opening a browser in the used electronic device 100 to search for information, the processor 130 of the electronic device 100 determines a type of a currently used application as the information query type, and further determines, according to Table 1, an image that is of a magnifying glass (Browsing) and that corresponds to the information query type as the first virtual robot image, for example, as shown in FIG. 7.

Figure 8:
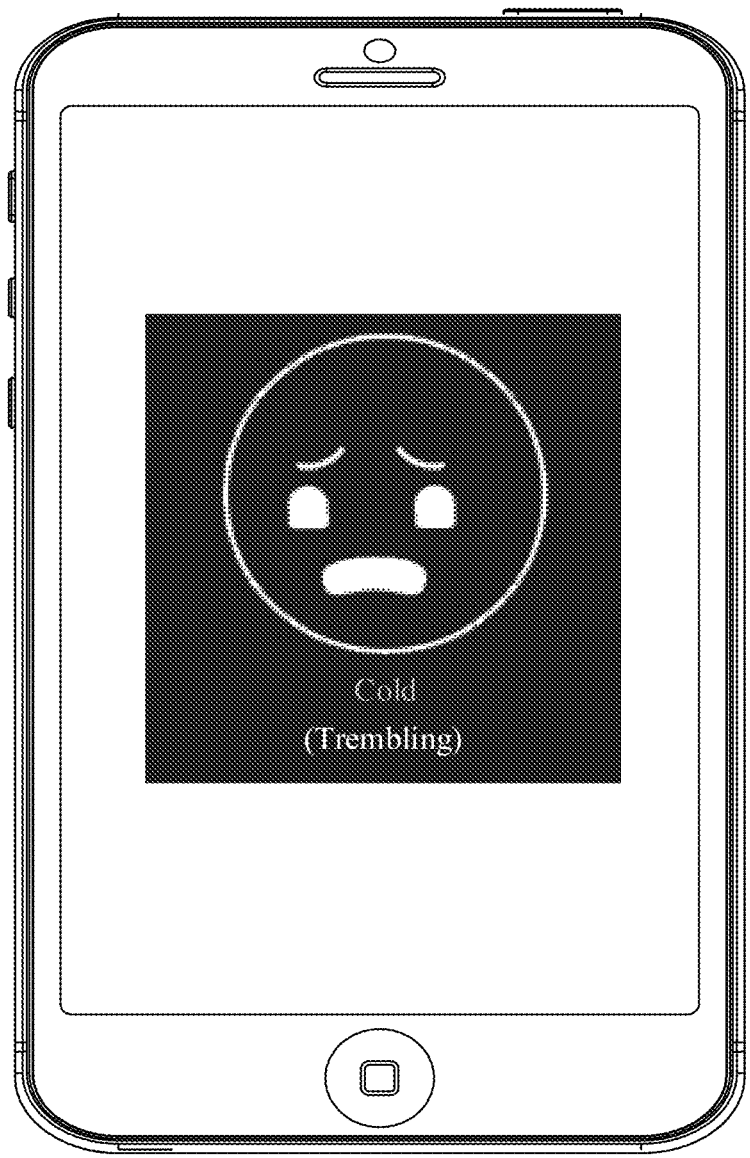
FIG. 8 is a schematic diagram of another virtual robot image according to this application.

For another example, when the processor 130 of the electronic device 100 detects, by using the temperature sensor, that an ambient temperature of the electronic device 100 plummets (for example, a temperature difference is 10° C.), the processor 130 further determines, according to Table 1, a trembling (Cold) image as the first virtual robot image, for example, as shown in FIG. 8. The electronic device 100 may obtain an indoor temperature value by using the temperature sensor of the electronic device 100 or a smart home device that can measure a room temperature and that is connected to the electronic device, may obtain an outdoor temperature value by using the temperature sensor of the electronic device 100 or a weather server, and determine whether a difference between indoor and outdoor temperatures is greater than a threshold. For example, there is heating indoors in the north, an indoor temperature is 25 degrees centigrade, and an outdoor temperature is −25 degrees centigrade. Alternatively, there is an air conditioner indoors in summer, an indoor temperature is 18 degrees centigrade, and an outdoor temperature is 33 degrees centigrade. This belongs to a temperature leap. In other words, the electronic device 100 obtains the temperature change information. Then, when the user goes from indoors to outdoors, the electronic device 100 can modify a presented virtual robot image when obtaining temperature plummeting. For example, the electronic device updates the default expression shown in FIG. 5 with a trembling image shown in FIG. 8. Optionally, the trembling may be replaced by using a sneezing image or the like. This is not limited in this application.

For another example, it is assumed that the processor 130 of the electronic device 100 determines, in the morning according to a weather application, that weather does not change obviously compared with a previous day, that there is no extreme weather information, and that there is no alarm weather information. The electronic device 100 obtains the birthday of the user according to a date recorded in a calendar. Then, the electronic device determines an image of scattering flowers to send blessings (Bless) as the first virtual robot image, for example, as shown in FIG. 9.

Figure 10:
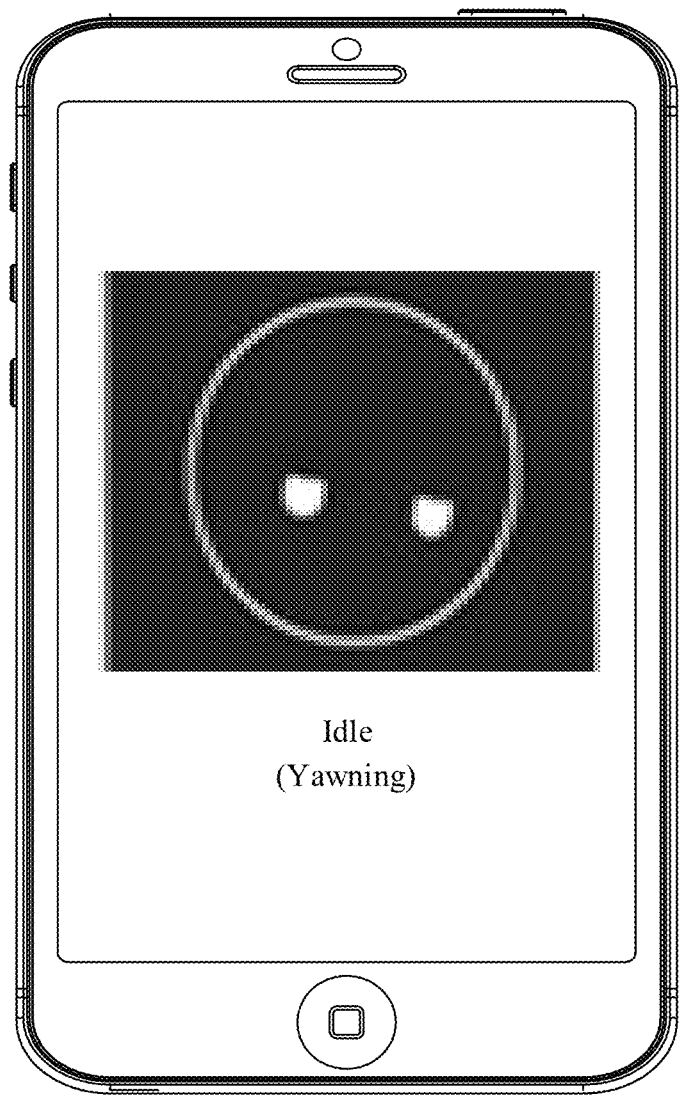
FIG. 10 is a schematic diagram of another virtual robot image according to this application.

For another example, it is assumed that the user wakes up the virtual robot at 23:30 PM on November 20, and the processor 130 of the electronic device 100 determines that current time period information is a sleeping time period. Then, the processor 130 determines a yawning (Idle2) image as the first virtual robot image, for example, as shown in FIG. 10.

Figure 9:
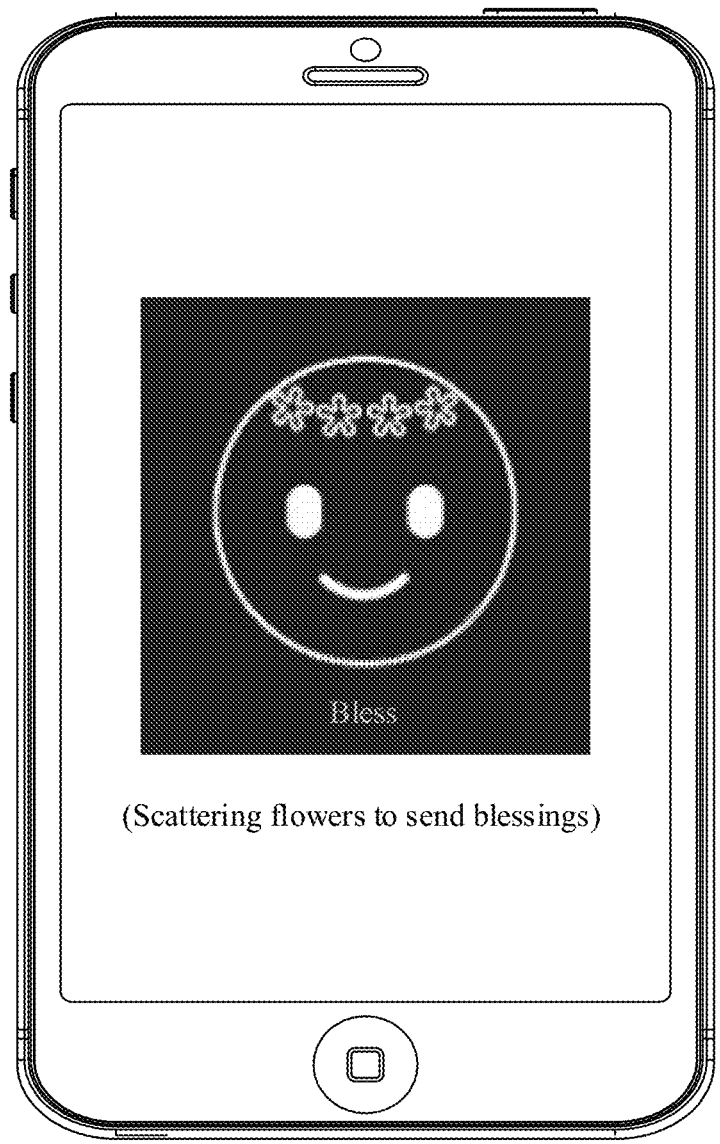
FIG. 9 is a schematic diagram of another virtual robot image according to this application.
Figure 11:
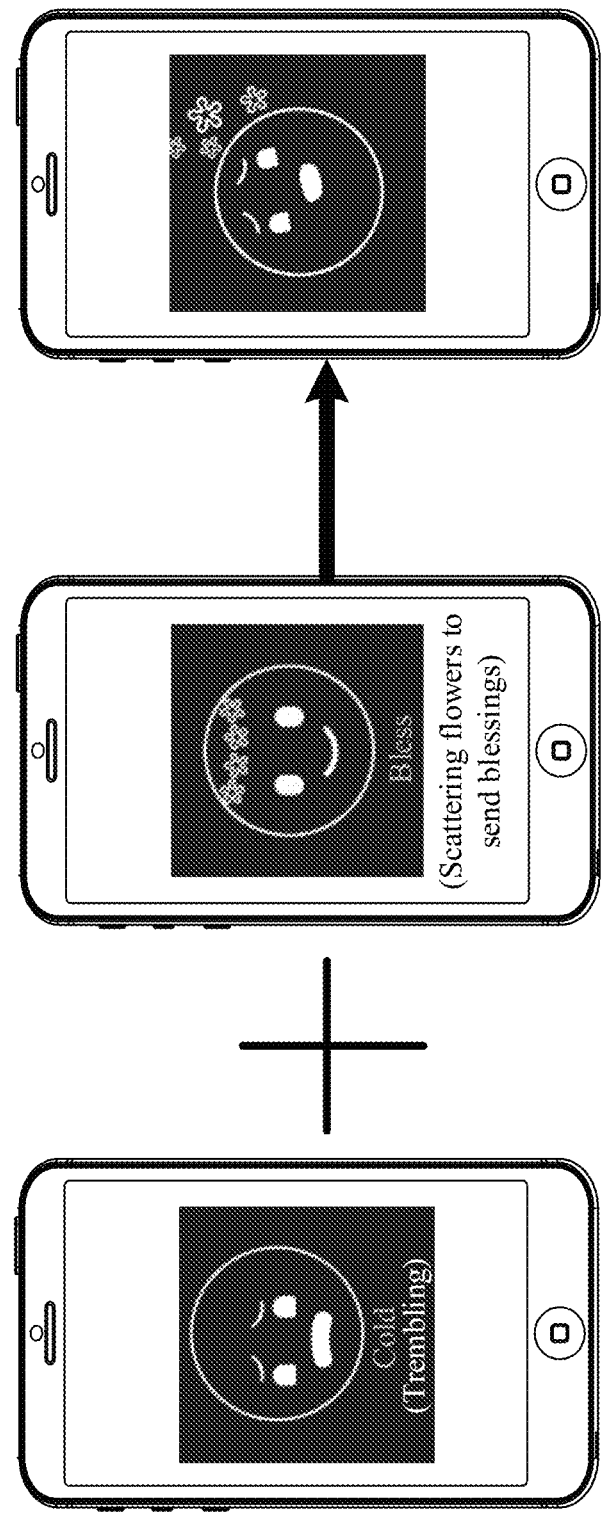
FIG. 11 is a schematic diagram of another virtual robot image according to this application.

For another example, when the processor 130 of the electronic device 100 determines that an ambient temperature of the electronic device 100 plummets, and determines that current time period information is the birthday of the user, the processor 130 generates a new virtual robot image by merging the virtual robot images shown in FIG. 8 and FIG. 9, and presents the new virtual robot image. For example, blessings are sent in a trembling voice and flowers are scattered dynamically, for example, as shown in FIG. 11.

For another example, the electronic device 100 may obtain a PM2.5 value by using a smart home device that can measure air quality and that is connected to the electronic device 100, and may obtain an outdoor PM2.5 value by using the weather server. The processor 130 determines whether a difference between indoor air quality and outdoor air quality is greater than a threshold. For example, there is heavy smog, and an indoor PM2.5 value is 23 micrograms per cubic meter after indoor air is purified by using an air purifier, but an outdoor PM2.5 value is 220 micrograms per cubic meter. This belongs to an air quality leap. Then, when the user goes from indoors to outdoors with the electronic device 100, the processor 130 obtains the air quality change information, namely, smog, and may further determine, according to Table 1, that the first virtual robot image may be an image of wearing a mask.

In an embodiment, when the plurality of pieces of information obtained by the electronic device 100 correspond to a plurality of virtual robot images, in addition to that the electronic device 100 may generate a new virtual robot image by merging the plurality of virtual robot images, and then use the new virtual robot image as the first virtual robot image, the electronic device 100 may further allow the user to select a favorite virtual robot image from the plurality of virtual robot images, and use, as the first virtual robot image, the virtual robot image selected by the user. For example, if a current date corresponds to a plurality of festivals (the birthday and the dragon boat festival), the electronic device 100 may generate a new virtual robot image by merging a virtual robot image corresponding to the birthday and a virtual robot image corresponding to the dragon boat festival, or may allow the user to manually specify a specific virtual robot image for a specific festival.

In an embodiment, virtual robot images of electronic devices 100 of different users may be determined based on personalized information (for example, social information, shopping information, and physiological features) of the users. In other words, the processor 130 of the electronic device 100 may further determine a virtual robot image based on personalized information of the user using the electronic device 100. For example, the processor 130 of the electronic device 100 may predict possible responses of the user in different weather/temperatures based on operation experience accumulated in a process of using, by the user, the electronic device 100, and determine corresponding virtual robot images. As mentioned above, hot (Hot) may also be expressed as a sweating image, an image of eating an ice pop, an image of sticking the tongue out, an image of enjoying the air conditioner, an image of enjoying the fan blowing, or the like. For example, the processor 130 of the electronic device 100 may further obtain weight information of the user, and select a virtual robot image based on the weight information of the user. For example, if a weight exceeds 75 kilograms, the processor 130 determines that the user is relatively fatty and may easily sweat, and the electronic device 100 may select the sweating image as the virtual robot image. For another example, the processor 130 obtains social information or shopping information of the user. For example, social photos published by the user usually include a dog, or the user purchased a dog-related pet supply. Then, the processor 130 may select the image of sticking the tongue out as the virtual robot image. For another example, if the processor 130 determines that social photos published by the user include a particular quantity of photos of eating an ice pop, or determines that there is shopping information of ice creams or ice pops, the processor 130 may select the image of eating an ice pop as the virtual robot image. For another example, the processor 130 obtains shopping information of the user, for example, the user purchased an air conditioner or a fan, or the processor 130 may determine, by comparing indoor and outdoor temperatures, whether the user has used an air conditioner. Then, the processor 130 may select the image of enjoying the air conditioner or enjoying the fan blowing as the virtual robot image.

Step 202. The processor 130 of the electronic device 100 transmits the generated first virtual robot image to the screen 1611, and presents the first virtual robot image by using the screen 1611.

For example, that the electronic device 100 presents the first virtual robot image may be that after generating the first virtual robot image by using the method in step 201, the processor 130 of the electronic device 100 notifies the first virtual robot image to the screen 1611 of the output unit 160, so that the screen 1611 presents the first virtual robot image. In an embodiment, when the first virtual robot image is a dynamic image, if there is a voice output corresponding to the virtual robot image in this case, the electronic device 100 may further play back a voice by using the loudspeaker 162 of the output unit 160 when presenting the virtual robot image by using the screen 1611. For a solution in which the electronic device 100 presents the first virtual robot image, refer to FIG. 4 to FIG. 11.

In an embodiment, after the electronic device 100 presents the first virtual robot image, the electronic device 100 may further perform the following operations: After detecting an input operation of the user by using the input unit 150, for example, the input operation may be a voice input implemented by using the another input device 152 (for example, a microphone) or a text input or a touch operation implemented by using the touch panel 151, the processor 130 of the electronic device 100 further determines instruction information of the user based on the input operation, determines, according to a preset mapping relationship between instruction information and a virtual robot image, a second virtual robot image corresponding to the instruction information, then generates a third virtual robot image by merging the first virtual robot image and the second virtual robot image, and presents the third virtual robot image by using the screen 1611.

In an embodiment, when the electronic device 100 determines the instruction information of the user based on the input operation, a specific determining method may be as follows:

When the input operation is a voice input, the processor 130 may analyze a speed, a tone, and a meaning that are produced when the user inputs information through voice, to determine the instruction information of the user. For example, when the user inputs "what is the date of the Christmas day this year?" in a gentle tone, the processor 130 identifies, based on the meaning, that the user currently is asking a question to the virtual robot, and therefore, the processor 130 determines that the instruction information of the user in this case is asking a question. For another example, after the virtual robot rapidly and correctly answers the question, the user inputs "you are brilliant" in a relaxed tone, the processor 130 identifies, based on the meaning, that the user currently is praising the virtual robot. In this case, the processor 130 determines that the instruction information of the user in this case is praising. For another example, when the virtual robot cannot answer the question of the user, the user inputs "why are you so stupid" through voice, and the processor 130 identifies, based on the meaning, that the user currently is rebuking the virtual robot. In this case, the processor 130 determines that the instruction information of the user in this case is rebuking.

When the input operation is a text input, the processor 130 may comprehensively analyze text content based on text content entered by the user and use of punctuation marks, and determine the instruction information of the user.

When the input operation is a touch operation, the processor 130 may determine an action intention of the user based on force of pressing, by the user (for example, by using a finger of the user), the touch panel 151 and a touch speed, and determine the instruction information of the user. For example, when the user gently touches the virtual robot image by using a finger pulp, the processor 130 may identify a current action of the user as fondling. In this case, the processor 130 may determine that the instruction information of the user in this case is fondling. For another example, when the user quickly presses the virtual robot image with force by using a finger, the processor 130 identifies a current action of the user as knocking, and the processor 130 may determine that the instruction information of the user in this case is knocking.

In an example manner, when the user shakes a mobile phone, the processor 130 identifies a current action of the user as shaking. In this case, the processor 130 may determine that the instruction information of the user is shaking.

In another example manner, when a time difference between a moment of previous interaction of the user with the virtual robot and a current moment exceeds 10 seconds, the processor 130 automatically determines that current instruction information of the user is that there is no interaction for a long time. The time difference, 10 seconds, is merely an example, and the time difference may be other duration. This is not limited in this application.

Certainly, in addition to the foregoing example, there may be a plurality of pieces of other instruction information. The information is not listed in this application.

In an embodiment, a mapping relationship between different instruction information and different virtual robot images may be pre-established, and the mapping relationship is stored in the memory 140. The mapping relationship between different instruction information and different virtual robot images may be stored in a form of a table, or may be stored based on another data structure. This is not limited herein. For example, a table used to represent the mapping relationship between different instruction information and different virtual robot images may be shown in the following Table 2.

TABLE 2

Mapping relationship between a virtual robot image and instruction information of a user

| Instruction information of the user | Emotional feedback of a virtual robot | Virtual robot image |
|---|---|---|
| Asking a question | Deep thinking | Thinking |
| | Question | Say what? |
| | Positive answer | Yes |
| | Negative answer | No |
| Appraising | Shy | Shyly |
| Thanks | You are welcome | You are welcome |
| Rebuking | Scared/grievance | Scary movie |
| Fondling | Happy | Special day |
| Knocking | Angry | Angry |
| There is no interaction for a long time | Dozing | Idle2 |

Figure 12:
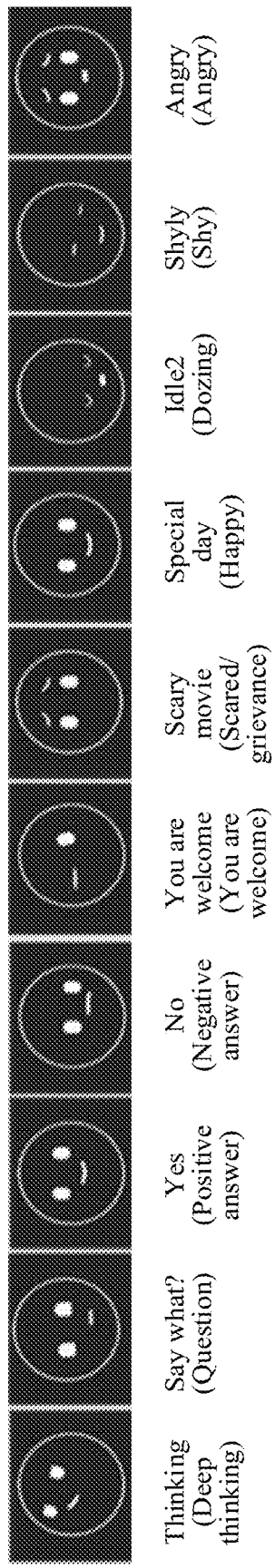
FIG. 12 is a schematic diagram of another virtual robot image according to this application.

Specific presentations of the virtual robot images in Table 2 may be virtual robot images shown in FIG. 12. It should be noted that Table 2 merely lists virtual robot images corresponding to some instruction information by way of example, and virtual robot images corresponding to much information are not shown in Table 2 (for example, when the instruction information is shaking, a corresponding virtual robot image is a dizzy image). The virtual robot images are not listed herein. It should be understood that the virtual robot images are merely examples, and do not constitute any limitation to information and a virtual robot image in this application.

It should be noted that Table 2 and Table 1 in the foregoing step 201 may be in a same mapping table, or may be two different mapping tables. This is not limited in this application.

Figure 13:
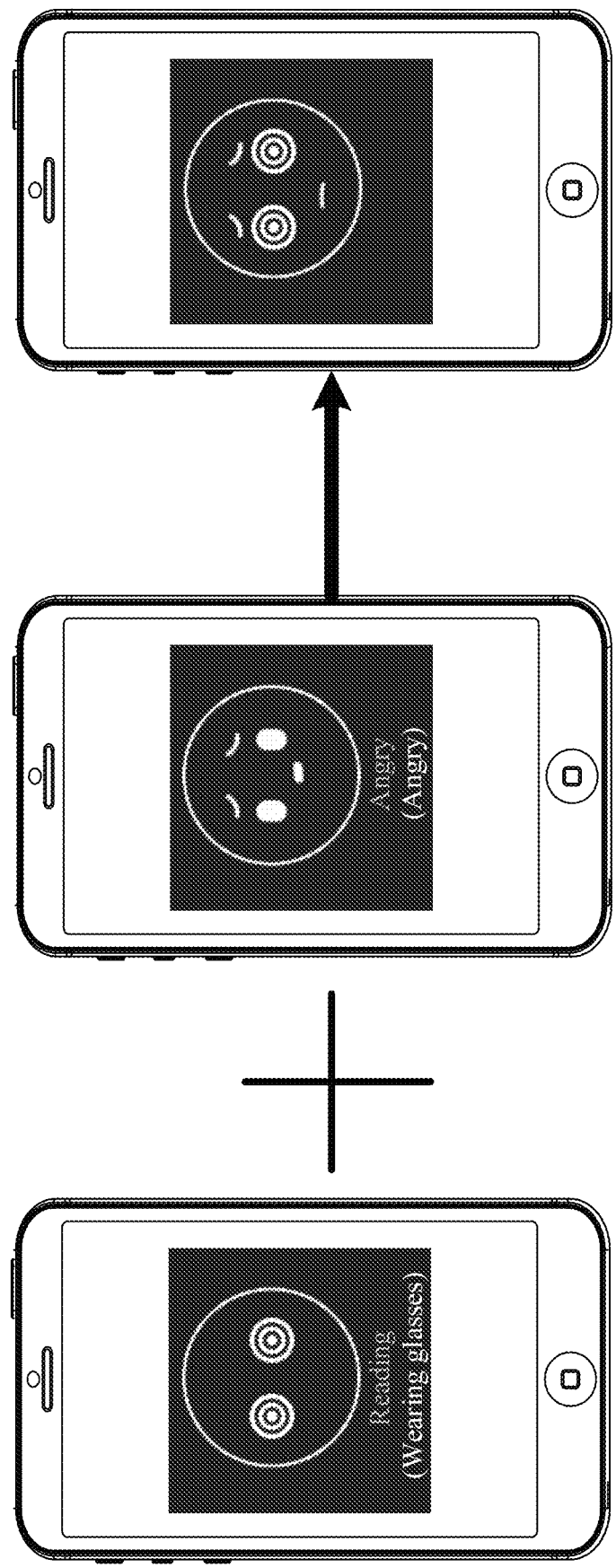
FIG. 13 is a schematic diagram of another virtual robot image according to this application.
Figure 14:
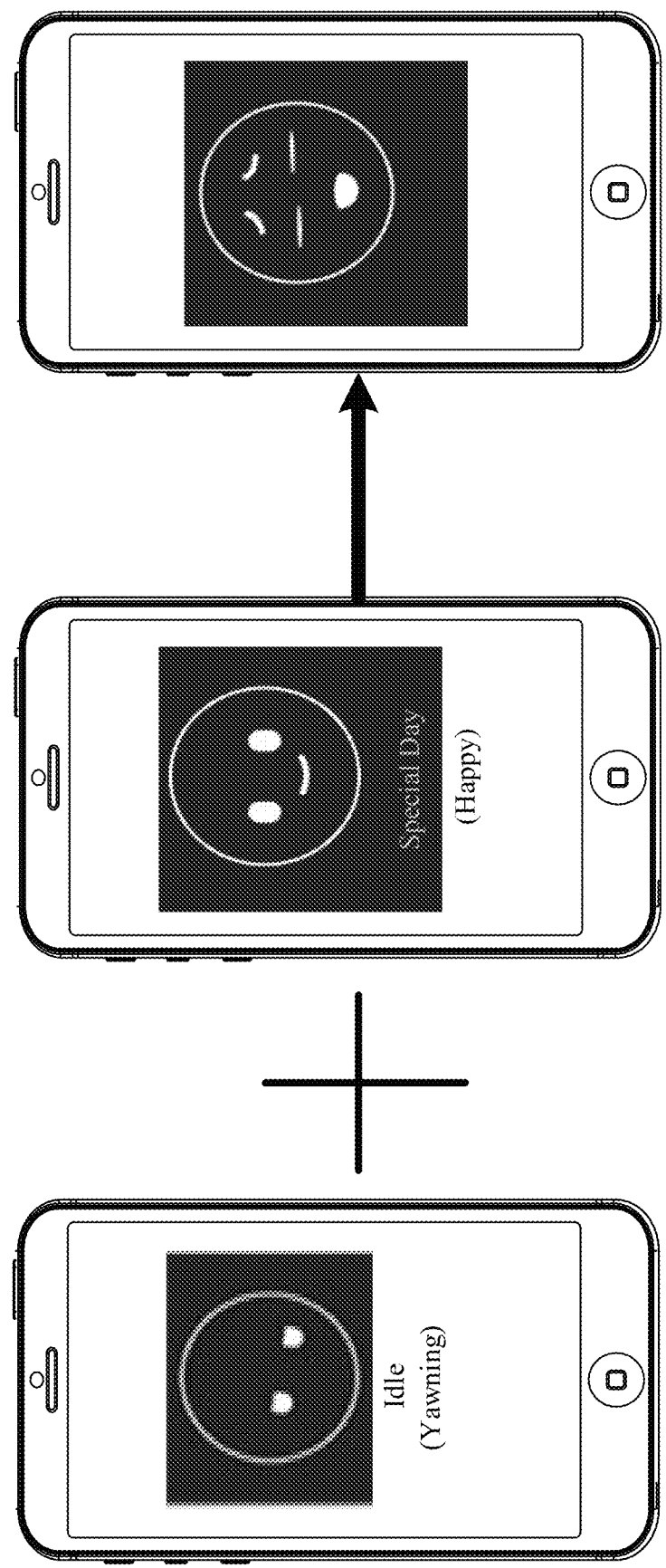
FIG. 14 is a schematic diagram of another virtual robot image according to this application.

In an embodiment, the processor 130 of the electronic device 100 may search Table 2 for the second virtual robot image corresponding to the instruction information of the user that is received by using the input unit 150, and then generate the third virtual robot image by merging the first virtual robot image and the second virtual robot image. For example, when the screen 1611 of the electronic device 100 currently already presents the first virtual robot image being the image that is of the magnifying glass (Reading) (as shown in FIG. 6) and that corresponds to the reading type. If the processor 130 determines that the current instruction information of the user is knocking, the processor determines, according to Table 2, that a virtual robot image corresponding to knocking, namely, an angry (Angry) image, as the second virtual robot image. Then, the processor 130 generates a new virtual robot image by merging the image (Reading) of the magnifying glass and the angry (Angry) image. In this case, the new virtual robot image generated through merging is the third virtual robot image, for example, a virtual robot image shown in FIG. 13. For another example, when the user wakes up the virtual robot at 24:00 in a day, and the processor 130 already presents, on the screen 1611, the first virtual robot image being the yawning (Idle) image (as shown in FIG. 10), the processor 130 determines that the current instruction information of the user is fondling, and determines, according to Table 2, that a virtual robot image corresponding to fondling, namely, a happy (Special day) image, as the second virtual robot image. Then, the electronic device 100 generates a new virtual robot image by merging the yawning (Idle) image and the happy (Special day) image. In this case, the new virtual robot image generated through merging is the third virtual robot image, for example, a virtual robot image shown in FIG. 14.

In an embodiment, the electronic device 100 may re-obtain current scene information every specified duration, then re-generate a first virtual robot image by using the method in step 201, and update and display a virtual robot image that is already presented on the screen 1611.

According to the virtual robot image presentation method provided in this embodiment of this application, a virtual robot image is determined based on scene information. The scene information includes at least one piece of information in first information and second information, the first information is used to represent a current time attribute, and the second information is used to represent a type of an application currently run in the electronic device. According to the foregoing method, in a human-machine interaction process, the virtual robot image can be richer and more vivid, so that user experience can be better, thereby improving virtual robot utilization of the user.

Figure 15:
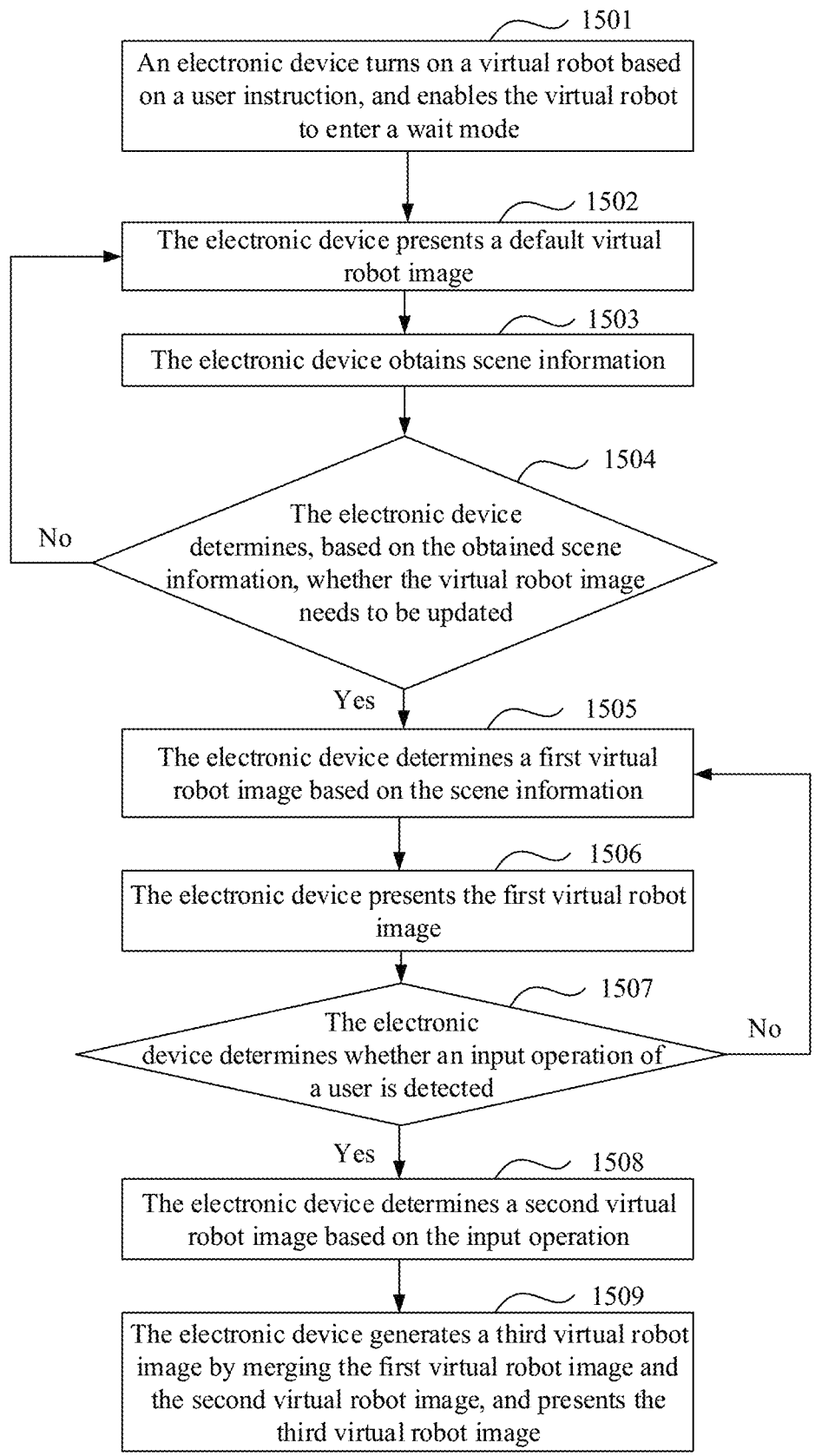
FIG. 15 is a flowchart of an example of a virtual robot image presentation method according to this application.

Based on the foregoing embodiment, an embodiment of this application further provides an example of a virtual robot image presentation method. Referring to FIG. 15, a flowchart of the example may include the following steps:

Step 1501. An electronic device turns on a virtual robot according to a user instruction, and enables the virtual robot to enter a wait mode.

Step 1502. The electronic device presents a default virtual robot image.

Step 1503. The electronic device obtains scene information.

Step 1504. The electronic device determines, based on the obtained scene information, whether the virtual robot image needs to be updated, and if the virtual robot image needs to be updated, performs step 1505, or if the virtual robot image does not need to be updated, performs step 1502.

Step 1505. The electronic device determines a first virtual robot image based on the scene information.

Step 1506. The electronic device presents the first virtual robot image.

Step 1507. The electronic device determines whether an input operation of a user is detected, and if the input operation of the user is detected, performs step 1508, or if the input operation of the user is not detected, performs step 1505.

Step 1508. The electronic device determines a second virtual robot image based on the input operation.

Step 1509. The electronic device generates a third virtual robot image by merging the first virtual robot image and the second virtual robot image, and presents the third virtual robot image.

For detailed descriptions of specific implementations of the steps, refer to the related descriptions in the embodiment shown in FIG. 2. Details are not described in this specific example again.

It should be noted that after turning on the virtual robot, the electronic device may repeat step 1503 to step 1509 every specified duration. In this way, a virtual robot image can be updated in real time, to experience latest emotion of the virtual robot in a human-machine interaction process, thereby improving user experience, and further improving virtual robot utilization of the user.

Figure 16:
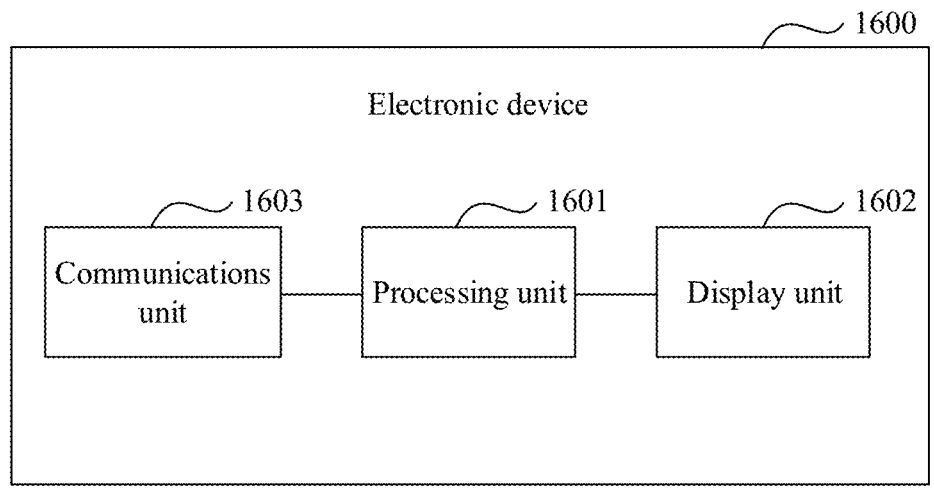
FIG. 16 is a schematic structural diagram of an electronic device according to this application.

Based on the foregoing embodiments, an embodiment of this application further provides an electronic device 1600. The electronic device is configured to implement a virtual robot image presentation method shown in FIG. 2 or FIG. 15. As shown in FIG. 16, the electronic device 1600 includes a processing unit 1601 and a display unit 1602.

The processing unit 1601 is configured to generate a first virtual robot image. The first virtual robot image is determined by the processing unit 1601 based on scene information. The scene information includes at least one piece of information in first information and second information, the first information is used to represent a current time attribute, and the second information is used to represent a type of an application currently run in the electronic device. The display unit 1602 is configured to present the first virtual robot image. In an embodiment, the first information is one or more of the following: festival information, current time period information, and the like. In an embodiment, the second information is one or more of the following: a reading type, a music type, an information query type, a default no-operation type, and the like.

In an embodiment, the scene information further includes third information, and the third information is used to represent a natural environment. In an embodiment, the third information is one or more of the following: weather information, temperature information, and the like. In an embodiment, the weather information includes one or more of the following: normal weather information, extreme weather information, alarm weather information, current air quality information, air quality change information, and the like. The temperature information includes one or more of the following: current temperature information and temperature change information. In an embodiment, the air quality change information includes one or more of the following: information about an air quality change caused by a location change, information about an air quality change caused by a time change, and the like. The temperature change information includes one or more of the following: information about a temperature change caused by a location change, information about a temperature change caused by a time change, and the like.

In an embodiment, the electronic device further includes a communications unit 1603. The communications unit 1603 is configured to obtain the scene information. When generating the first virtual robot image, the processing unit 1601 is configured to determine the first virtual robot image based on the scene information obtained by the communications unit 1603.

In an embodiment, the scene information includes only one piece of information; the one piece of information is the first information or the second information; and when determining the first virtual robot image based on the scene information, the processing unit 1601 is configured to determine, according to a preset mapping relationship between scene information and a virtual robot image, a virtual robot image corresponding to the one piece of information, and use the determined virtual robot image as the first virtual robot image.

In an embodiment, the scene information includes a plurality of pieces of information; when determining the first virtual robot image based on the scene information, the processing unit 1601 is configured to determine, according to a preset mapping relationship between scene information and a virtual robot image, a virtual robot image corresponding to each of the plurality of pieces of information, and generate the first virtual robot image by merging the determined plurality of virtual robot images.

In an embodiment, after the display unit 1602 presents the first virtual robot image, when detecting an input operation of a user, the processing unit 1601 determines instruction information input by the input operation, determines, according to a preset mapping relationship between instruction information and a virtual robot image, a second virtual robot image corresponding to the instruction information, and generates a third virtual robot image by merging the first virtual robot image and the second virtual robot image, where the third virtual robot image reflects scene information corresponding to the first virtual robot image and the instruction information corresponding to the second virtual robot image. Then, the display unit 1602 presents the third virtual robot image. In an embodiment, the input operation includes one or more of the following operations: a voice input, a text input, and a touch operation.

In an embodiment, before generating the first virtual robot image, the processing unit 1601 turns on a virtual robot according to a user instruction, and enables the virtual robot to enter a wait mode.

In an embodiment, any virtual robot image (including the first virtual robot image, the second virtual robot image, and the third virtual robot image) is a static image or a dynamic image.

The electronic device provided in this embodiment of this application generates the first virtual robot image, and presents the first virtual robot image, where the first virtual robot image is determined by the electronic device based on the scene information. The scene information includes at least one piece of information in the first information and the second information, the first information is used to represent the current time attribute, and the second information is used to represent the type of the application currently run in the electronic device. In this way, in a human-machine interaction process, the virtual robot image can be richer and more vivid, so that user experience can be better, thereby improving virtual robot utilization of the user.

It should be noted that, in this embodiment of this application, unit division is exemplary, and is merely a logical function division. In actual implementation, another division manner may be used. Functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, or a network device) or a processor to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

Figure 17:
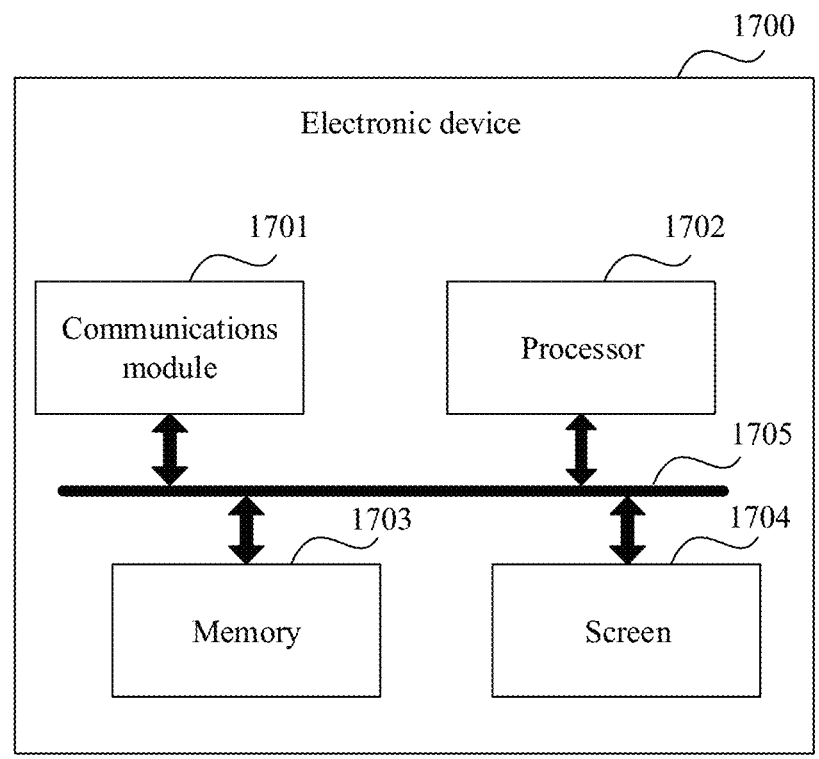
FIG. 17 is a structural diagram of an electronic device according to an embodiment of this application.

Based on the foregoing embodiments, an embodiment of this application further provides an electronic device 1700. The electronic device is configured to implement a virtual robot image presentation method shown in FIG. 2 or FIG. 15. As is shown in FIG. 17, the electronic device 1700 includes a processor 1702 and a screen 1704. Optionally, the electronic device 1700 further includes a communications module 1701 and a memory 1703.

The processor 1702 may be a central processing unit (CPU), a network processor (NP), or a combination of the CPU and the NP. The processor 1702 may further include a hardware chip. The hardware chip may be an application-specific integrated circuit (ASIC), a programmable logic device (PLD), or a combination of the ASIC and the PLD. The PLD may be a complex programmable logic device (CPLD), a field-programmable gate array (FPGA), a generic array logic (GAL), or any combination thereof.

The communications module 1701, the processor 1702, and the memory 1703 are connected to each other. Optionally, the communications module 1701, the processor 1702, and the memory 1703 are connected to each other by using a bus 1705. The bus 1705 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 17, but this does not mean that there is only one bus or only one type of bus.

When the electronic device 1700 is configured to implement a virtual robot image presentation method shown in FIG. 2 or FIG. 3:

The processor 1702 is configured to generate a first virtual robot image. The first virtual robot image is determined by the processor 1702 based on scene information. The scene information includes at least one piece of information in first information and second information, the first information is used to represent a current time attribute, and the second information is used to represent a type of an application currently run in the electronic device. The screen 1704 is configured to present the first virtual robot image. In an embodiment, the first information is one or more of the following: festival information and current time period information. In an embodiment, the second information is one or more of the following: a reading type, a music type, an information query type, and a default no-operation type.

In an embodiment, the scene information further includes third information, and the third information is used to represent a natural environment. For example, the third information is one or more of the following: weather information and temperature information. For example, the weather information includes one or more of the following: normal weather information, extreme weather information, alarm weather information, current air quality information and air quality change information. The temperature information includes one or more of the following: current temperature information and temperature change information. For example, the air quality change information includes one or more of the following: information about an air quality change caused by a location change and information about an air quality change caused by a time change. The temperature change information includes one or more of the following: information about a temperature change caused by a location change and information about a temperature change caused by a time change.

In an embodiment, when the electronic device 1700 further includes the communications module 1701, the communications module 1701 is configured to obtain the scene information, where the communications module 1701 may be, but is not limited to, an RF circuit, a WiFi module, a communications interface (or a network interface or a communications unit), a Bluetooth module, or the like.

In an embodiment, when generating the first virtual robot image, the processor 1702 is configured to determine the first virtual robot image based on the scene information obtained by the communications module 1701.

In an embodiment, the scene information includes only one piece of information; the one piece of information is the first information or the second information; and when determining the first virtual robot image based on the scene information, the processor 1702 is configured to determine, according to a preset mapping relationship between scene information and a virtual robot image, a virtual robot image corresponding to the one piece of information, and use the determined virtual robot image as the first virtual robot image.

In an embodiment, the scene information includes a plurality of pieces of information; when determining the first virtual robot image based on the scene information, the processor 1702 is configured to determine, according to a preset mapping relationship between scene information and a virtual robot image, a virtual robot image corresponding to each of the plurality of pieces of information, and generate the first virtual robot image by merging the determined plurality of virtual robot images.

In an embodiment, after presenting the first virtual robot image on the screen, the processor 1702 is further configured to: after detecting an input operation of a user, determine instruction information input by the input operation, determine, according to a preset mapping relationship between instruction information and a virtual robot image, a second virtual robot image corresponding to the instruction information, generate a third virtual robot image by merging the first virtual robot image and the second virtual robot image, where the third virtual robot image reflects scene information corresponding to the first virtual robot image and the instruction information corresponding to the second virtual robot image. Then, the screen 1704 presents the third virtual robot image. In an embodiment, the input operation includes one or more of the following operations: a voice input, a text input, and a touch operation.

In an embodiment, before generating the first virtual robot image, the processor 1702 turns on a virtual robot according to a user instruction, and enables the virtual robot to enter a wait mode.

In an embodiment, any virtual robot image (including the first virtual robot image, the second virtual robot image, and the third virtual robot image) is a static image or a dynamic image.

In an embodiment, the memory 1703 is configured to store a program and the like. The program may include program code, and the program code includes a computer operation instruction. The memory 1703 may include a RAM, or may be a non-volatile memory, for example, at least one magnetic disk memory. The processor 1702 executes the application program stored in the memory 1703 to implement the foregoing function, to implement the virtual robot image presentation method shown in FIG. 2 or FIG. 3.

In an embodiment, the memory 1703 is further configured to store a mapping relationship between a virtual robot image and scene information.

The electronic device provided in this embodiment of this application generates the first virtual robot image, and presents the first virtual robot image, where the first virtual robot image is determined by the electronic device based on the scene information. The scene information includes at least one piece of information in the first information and the second information, the first information is used to represent the current time attribute, and the second information is used to represent the type of the application currently run in the electronic device. In this way, in a human-machine interaction process, the virtual robot image can be richer and more vivid, so that user experience can be better, thereby improving virtual robot utilization of the user.

The embodiments of this application provide the virtual robot image presentation method, the apparatus, and the electronic device, to generate the first virtual robot image, and presents the first virtual robot image, where the first virtual robot image is determined by the electronic device based on the scene information. The scene information includes at least one piece of information in the first information and the second information, the first information is used to represent the current time attribute, and the second information is used to represent the type of the application currently run in the electronic device. According to the foregoing method, in a human-machine interaction process, the virtual robot image can be richer and more vivid, so that user experience can be better, thereby improving virtual robot utilization of the user.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to embodiments of this application without departing from the scope of this application. This application is intended to cover these modifications and variations provided that they fall within the scope of protection defined by the following claims and their equivalent technologies.

What is claimed is:

1. A virtual robot image presentation method, applied in an electronic device having a display screen, wherein the method comprises:
   generating, by the electronic device, a first virtual robot image, wherein the first virtual robot image is determined by the electronic device based on scene information, wherein the scene information comprises a plurality of pieces of information including at least one piece of information in first information, second information and third information, the first information is used to represent a current time attribute, and the second information is used to represent a type of an application currently running in the electronic device, and the third information is used to represent a natural environment, and that the electronic device determines the first virtual robot image based on the scene information comprises:
   a) determining, by the electronic device according to a preset mapping relationship between the scene information and a virtual robot image, a plurality of virtual robot images, each corresponding to one of the plurality of pieces of information; and
   b) generating, by the electronic device, the first virtual robot image by merging the determined plurality of virtual robot images; and
   presenting, by the electronic device, the first virtual robot image on the display screen.

2. The method according to claim 1, wherein the scene information comprises only one piece of information, the one piece of information is the first information or the second information, and that the electronic device determines the first virtual robot image based on the scene information comprises:
   determining, by the electronic device, according to a preset mapping relationship between the scene information and a virtual robot image, a virtual robot image corresponding to the one piece of information, and using the determined virtual robot image as the first virtual robot image.

3. The method according to claim 1, wherein after the presenting, by the electronic device, the first virtual robot image on the display screen, the method further comprises:
   detecting, by the electronic device, an input operation of a user, and determining instruction information based on the input operation;
   determining, by the electronic device according to a preset mapping relationship between the instruction information and a virtual robot image, a second virtual robot image corresponding to the instruction information; and
   generating, by the electronic device, a third virtual robot image by merging the first virtual robot image and the second virtual robot image, and presenting the third virtual robot image on the display screen, wherein the third virtual robot image reflects the scene information corresponding to the first virtual robot image and the instruction information corresponding to the second virtual robot image.

4. The method according to claim 3, wherein the input operation comprises one or more of the following operations: a voice input, a text input, and a touch operation.

5. The method according to claim 1, wherein before the generating, by the electronic device, the first virtual robot image, the method further comprises:
   turning on, by the electronic device according to a user instruction, a virtual robot, and enabling the virtual robot to enter a wait mode.

6. The method according to claim 1, wherein the third information is one or more of the following: weather information and temperature information.

7. The method according to claim 6, wherein the weather information comprises one or more of the following: normal weather information, extreme weather information, alarm weather information, current air quality information, and air quality change information; and/or
   the temperature information comprises one or more of the following: current temperature information and temperature change information.

8. The method according to claim 7, wherein the air quality change information comprises one or more of the following: information about an air quality change caused by a location change and information about an air quality change caused by a time change; and/or
   the temperature change information comprises one or more of the following: information about a temperature change caused by a location change and information about a temperature change caused by a time change.

9. An electronic device, comprising a processor and a display screen, wherein
   the processor is configured to generate a first virtual robot image, wherein the first virtual robot image is determined by the processor based on scene information, wherein the scene information comprises a plurality of pieces of information including at least one piece of information in first information, second information and third information, the first information is used to represent a current time attribute, and the second information is used to represent a type of an application currently running in the electronic device, and the processor, when determining the first virtual robot image based on the scene information, is configured to:
   a) determine, according to a preset mapping relationship between the scene information and a virtual robot image, a plurality of virtual robot images, each corresponding to one of the plurality of pieces of information; and
   b) generate the first virtual robot image by merging the determined plurality of virtual robot images; and
the display screen is configured to present the first virtual robot image.

10. The electronic device according to claim 9, wherein the scene information comprises only one piece of information, the one piece of information is the first information or the second information, and the processor, when determining the first virtual robot image based on the scene information, is configured to:
   determine, according to a preset mapping relationship between the scene information and a virtual robot image, a virtual robot image corresponding to the one piece of information, and use the determined virtual robot image as the first virtual robot image.

11. The electronic device according to claim 9, wherein after presenting the first virtual robot image on the display screen, the processor is further configured to:
   detect an input operation of a user, and determine instruction information based on the input operation;
   determine, according to a preset mapping relationship between the instruction information and a virtual robot image, a second virtual robot image corresponding to the instruction information; and
   generate a third virtual robot image by merging the first virtual robot image and the second virtual robot image, wherein the third virtual robot image reflects the scene information corresponding to the first virtual robot image and the instruction information corresponding to the second virtual robot image; and
the display screen is further configured to present the third virtual robot image.

12. The electronic device according to claim 11, wherein the input operation comprises one or more of the following operations: a voice input, a text input, and a touch operation.

13. The electronic device according to claim 9, wherein before presenting the first virtual robot image, the processor is further configured to:
   turn on a virtual robot according to a user instruction, and enable the virtual robot to enter a wait mode.

14. The electronic device according to claim 9, wherein the third information is one or more of the following: weather information and temperature information.

15. The electronic device according to claim 14, wherein the weather information comprises one or more of the following: normal weather information, extreme weather information, alarm weather information, current air quality information, and air quality change information; and/or
   the temperature information comprises one or more of the following: current temperature information and temperature change information.

16. The electronic device according to claim 15, wherein the air quality change information comprises one or more of the following: information about an air quality change caused by a location change and information about an air quality change caused by a time change; and/or
   the temperature change information comprises one or more of the following: information about a temperature change caused by a location change and information about a temperature change caused by a time change.

* * * * *